United States Patent [19]

Guiher

[11] Patent Number: 5,636,755
[45] Date of Patent: Jun. 10, 1997

[54] STORAGE RACK SYSTEM WITH FIRE EXTINGUISHING DEVICE

[75] Inventor: William T. Guiher, Greenbrier, Tenn.

[73] Assignee: Unarco LLC, Wagoner, Okla.

[21] Appl. No.: 391,956

[22] Filed: Feb. 21, 1995

Related U.S. Application Data

[60] Continuation-in-part of Ser. No. 341,749, Nov. 18, 1994, Pat. No. 5,526,945, which is a division of Ser. No. 95,607, Jul. 21, 1993, Pat. No. 5,368,174, which is a continuation-in-part of Ser. No. 926,458, Aug. 7, 1992, abandoned.

[51] Int. Cl.$^6$ ............... A47F 5/00; A62C 3/00; B05B 1/26
[52] U.S. Cl. ............... 211/183; 211/127.1; 211/191; 169/16; 239/500
[58] Field of Search ............... 211/127, 183, 211/191, 192; 248/300, 48.1, 48.2; 312/115; 141/86, 87, 88; 239/499, 500, 502; 169/5, 16, 64; 52/11, 12, 13, 14, 15

[56] References Cited

U.S. PATENT DOCUMENTS

| | | | |
|---|---|---|---|
| 1,303,185 | 5/1919 | Eichling, Jr. | 211/127 X |
| 1,778,141 | 10/1930 | Birdsong et al. | 211/127 |
| 2,548,904 | 4/1951 | Neal et al. | 239/499 |
| 2,809,074 | 10/1957 | McDonald | 199/106 |
| 2,865,674 | 12/1958 | Jelmeland | 169/5 |
| 3,520,345 | 7/1970 | Lillibridge et al. | 159/2 |
| 3,539,108 | 11/1970 | Lillibridge | 239/209 |
| 3,720,268 | 3/1973 | Seiz | 169/2 R |
| 3,727,694 | 4/1973 | Dudzik | 169/2 R |
| 4,071,193 | 1/1978 | Sternly et al. | 239/502 X |
| 4,085,896 | 4/1978 | Dorsch et al. | 239/504 |
| 4,178,994 | 12/1979 | Ito et al. | 169/52 |
| 4,401,165 | 8/1983 | Gutermuth et al. | 169/54 |
| 4,418,757 | 12/1983 | Merkel | 169/54 |
| 4,473,973 | 10/1984 | Lane | 52/15 X |
| 4,484,634 | 11/1984 | Swanson et al. | 169/52 |
| 5,199,582 | 4/1993 | Halstrick | 312/115 X |
| 5,386,917 | 2/1995 | Clark et al. | 211/183 |

FOREIGN PATENT DOCUMENTS

1087133 A 4/1984 U.S.S.R.

*Primary Examiner*—Leslie A. Braun
*Assistant Examiner*—Donald J. Wallace
*Attorney, Agent, or Firm*—Dressler, Rockey, Milnamow & Katz, Ltd.

[57] ABSTRACT

In a storage rack system comprising a storage rack and a fire extinguishing device, a horizontally extending beam of the storage rack is located in a fixed position, at a predetermined elevation above a support surface. An outer wall of the beam defines a generally flat, inclined surface facing outwardly and downwardly at an angle in a range from about 10° to about 80° relative to a vertical plane. A vane is mounted to the beam so as to extend horizontally, below the beam, and so as to be parallel to the beam. The vane has a surface facing toward the beam and a surface facing away from the beam. The fire extinguishing device is spaced horizontally from the inclined surface and located in a fixed position relative to the storage rack, such that when the fire extinguishing device is discharging a fluid, if the discharged fluid impinges upon the inclined surface, the inclined surface deflects the impinging fluid against the surface facing toward the beam and the surface facing toward the beam redirects the deflected fluid. The surface facing toward the beam, at an inner portion of the vane, defines an angle within a range from about 80° below a horizontal plane to about 90° above a horizontal plane, and may extend inwardly and horizontally. At an outer portion of the vane, the surfaces facing toward and away from the beam are inclined so as to be generally parallel to the inclined surface of the beam.

17 Claims, 3 Drawing Sheets

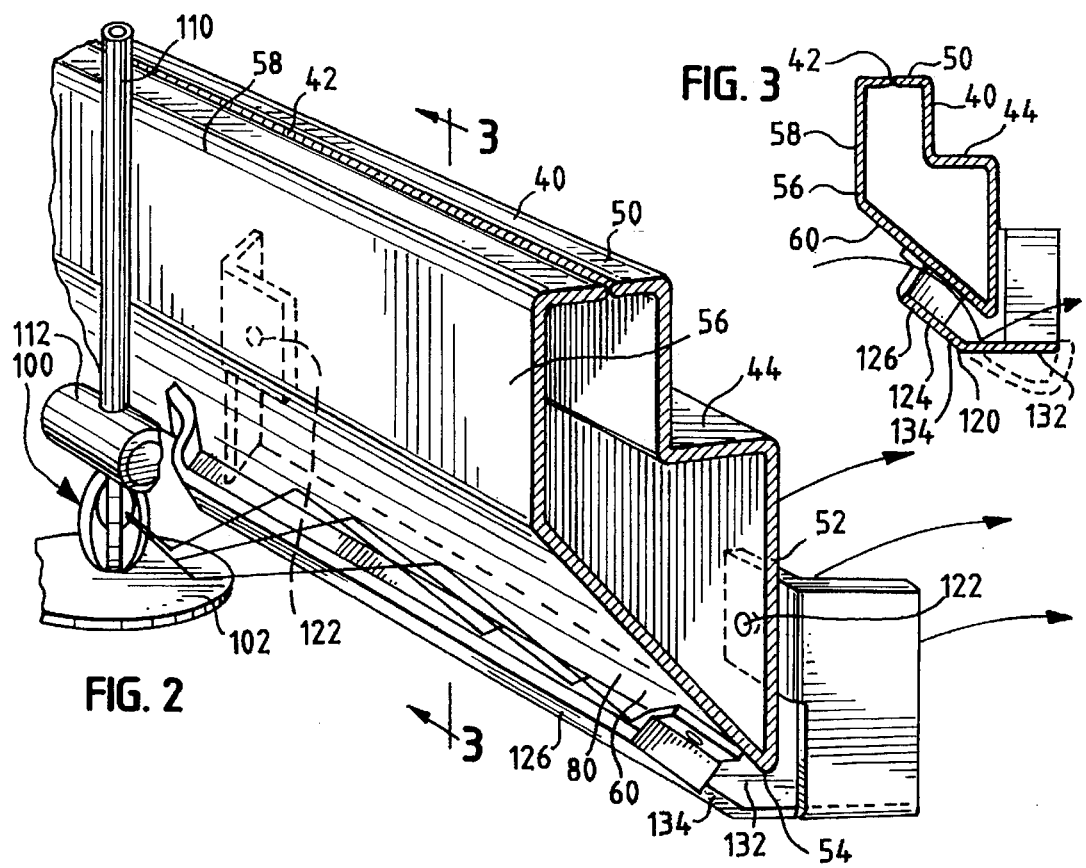
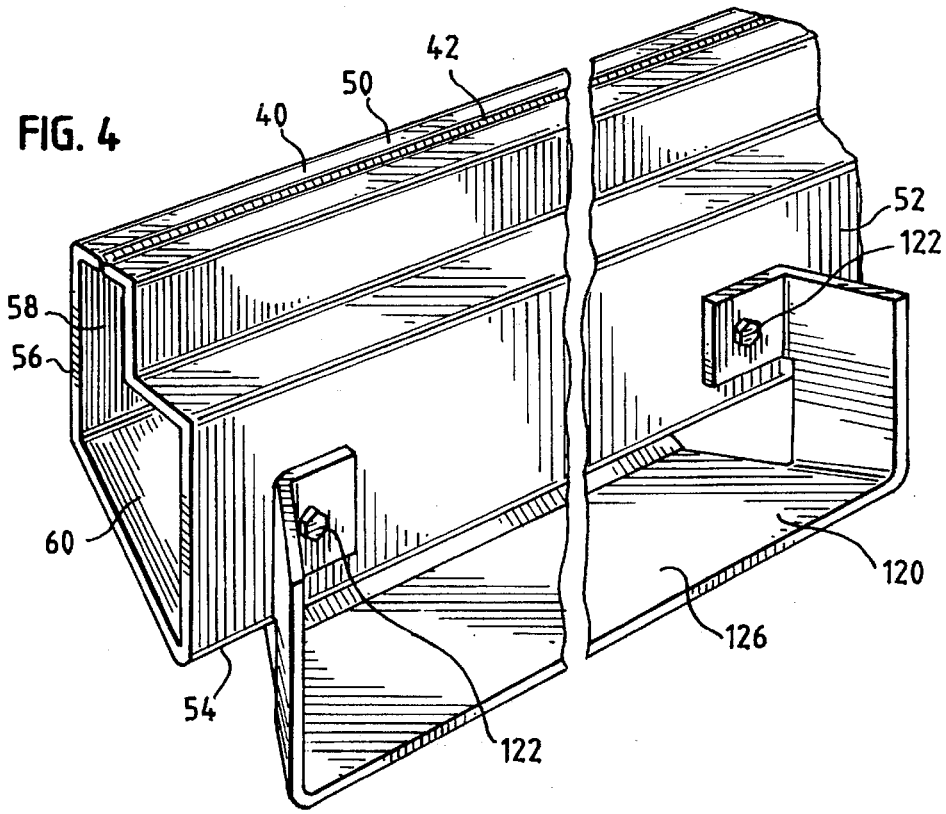

STORAGE RACK SYSTEM WITH FIRE EXTINGUISHING DEVICE

CROSS-REFERENCE TO RELATED APPLICATIONS

This application is a continuation-in-part of U.S. patent application Ser. No. 08/341,749, now U.S. Pat. No. 5,526,945 which was filed on Nov. 18, 1994. U.S. patent application Ser. No. 08/341,749 is a division of U.S. patent application Ser. No. 08/095,607, which was filed on Jul. 21, 1993, now U.S. Pat. No. 5,368,174. U.S. patent application Ser. No. 08/095,607 is a continuation-in-part of U.S. patent application Ser. No. 07/926,458, which was filed on Aug. 7, 1992, now abandoned.

TECHNICAL FIELD OF THE INVENTION

This invention pertains to a storage rack system comprising a storage rack and a fire extinguishing device. In the storage rack, a vane is employed for redirecting fluid discharged by the fire extinguishing device, preferably after such fluid has been diverted by a rigid member, such as a horizontally extending beam.

BACKGROUND OF THE INVENTION

In a warehouse, in which it is common to locate a storage rack next to a wall or next to another rack, a fire in a stored load can spread easily through such a rack and from one rack to another. Thus, it is common to install fire extinguishing systems, which employ fire extinguishing devices in close proximity to the stored loads. If the rack beams are located within the spraying patterns created by the fire extinguishing devices, the rack beams tend to deflect the fire extinguishing fluid away from the stored loads.

An improved system comprising a storage rack and a fire extinguishing device is disclosed in all but the first of the related applications noted above and in U.S. Pat. No. 5,386,917, which issued from a division of U.S. patent application Ser. No. 08/095,607, supra. In the improved system, the storage rack includes a beam having an inclined surface, which faces outwardly and downwardly and is inclined at an angle in a range from about 10° to about 80° relative to a vertical plane. When the fire extinguishing device is discharging a fluid, if at least some of the discharged fluid impinges upon the inclined surface, the inclined surface deflects at least some of the impinging fluid downwardly and inwardly.

SUMMARY OF THE INVENTION

This invention provides a further improved system comprising a storage rack and a fire extinguishing device, as disclosed in all but the first of the related applications noted above and in U.S. Pat. No. 5,386,917. Broadly, in the further improved system, a vane is employed for redirecting fluid discharged by the fire extinguishing device.

In one contemplated embodiment, the storage rack includes a beam located in a fixed position, at a predetermined elevation above a support surface. The beam extends horizontally and includes an outer wall defining a generally flat, inclined surface facing outwardly and downwardly. The inclined surface is inclined at an angle in a range from about 10° to about 80° relative to a vertical plane. Furthermore, the fire extinguishing device is arranged to discharge a fluid, spaced horizontally from the inclined surface, and located in a fixed position relative to the storage rack.

In the aforenoted embodiment, the storage rack includes a vane mounted so as to extend horizontally, below the beam, and so as to be parallel to the beam. The vane has a surface facing toward the beam and a surface facing away from the beam. When the fire extinguishing device is discharging a fluid, if at least some of the discharged fluid impinges upon the inclined surface of the beam, the inclined surface deflects at least some of the impinging fluid against the vane surface facing toward the beam whereupon the vane surface facing toward the beam redirects at least some of the deflected fluid.

Desirably, at an inner portion of the vane, the vane surface facing toward the beam defines an angle within a range from about 80° below a horizontal plane to about 90° above a horizontal plane. Preferably, at the inner portion of the vane, such surface extends inwardly in a substantially horizontal direction. Preferably, at the outer portion of the vane, the vane surface facing away from the beam is inclined so as to be generally parallel to the inclined surface of the beam.

Desirably, the vane is mounted rigidly to the beam. Preferably, the outer portion of the vane is mounted to the inclined surface of the beam, and the inner portion of the vane is mounted to an inner surface of the beam.

These and other objects, features, and advantages of this invention are evident from the following description of a preferred embodiment of this invention with reference to the accompanying drawings.

BRIEF DESCRIPTION OF THE DRAWINGS

FIG. 2 on an enlarged scale, is a fragmentary, perspective detail showing a beam of one of the storage racks, a vane mounted to the beam, and the fire extinguishing device. The fire extinguishing device again is shown as discharging a fire extinguishing fluid.

FIG. 3 is a sectional view taken along line 3—3 of FIG. 2, in a direction indicated by arrows.

FIG. 4 is a fragmentary, perspective view showing the beam and the vane, as seen from a different vantage.

DETAILED DESCRIPTION OF THE PREFERRED EMBODIMENT

Figure 1:
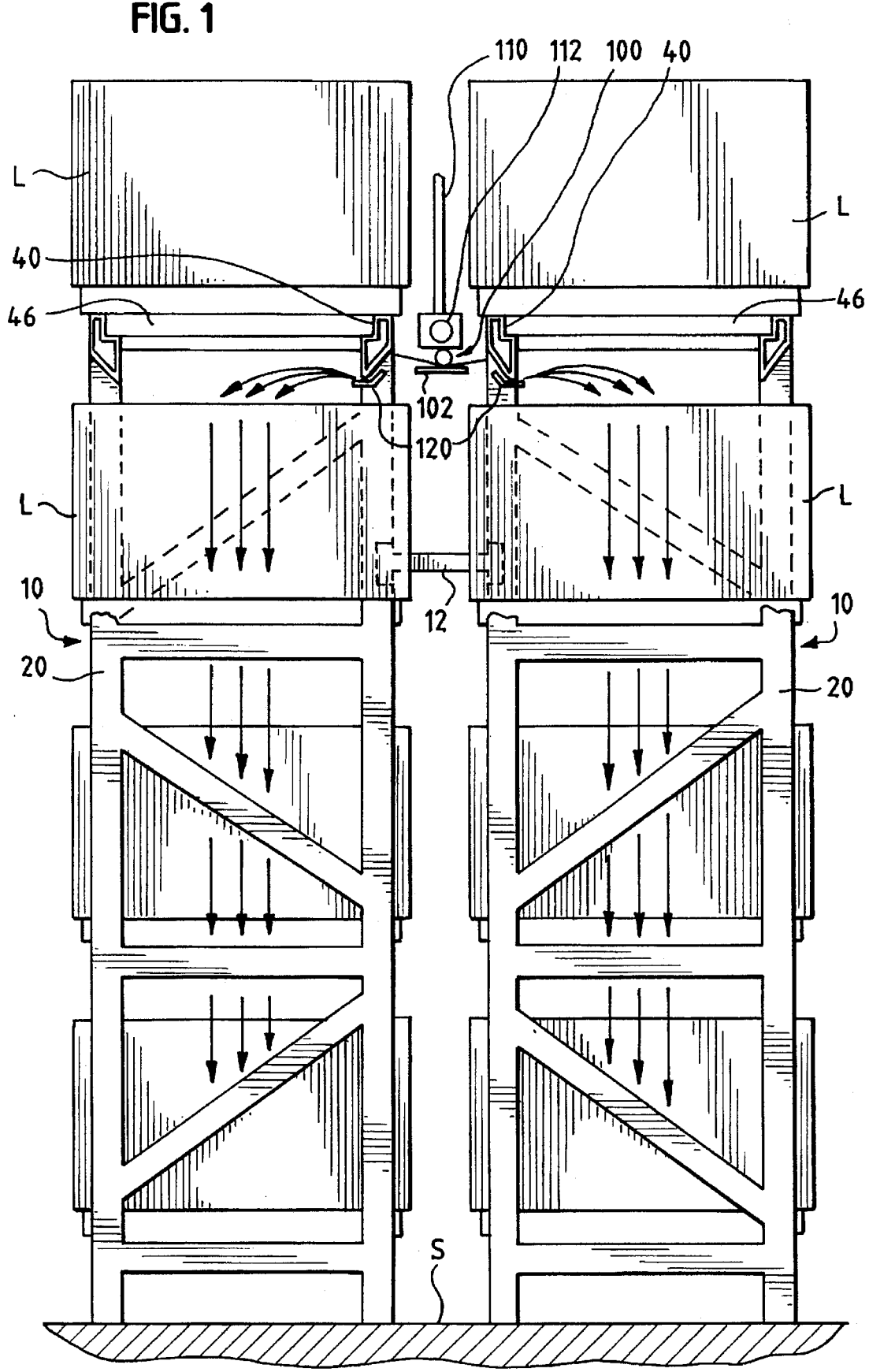
FIG. 1 is a simplified, elevational view of a storage rack system comprising two storage racks wall a fire extinguishing device between the storage racks. The fire extinguishing device is shown as discharging a fire extinguishing fluid.
Figure 5:
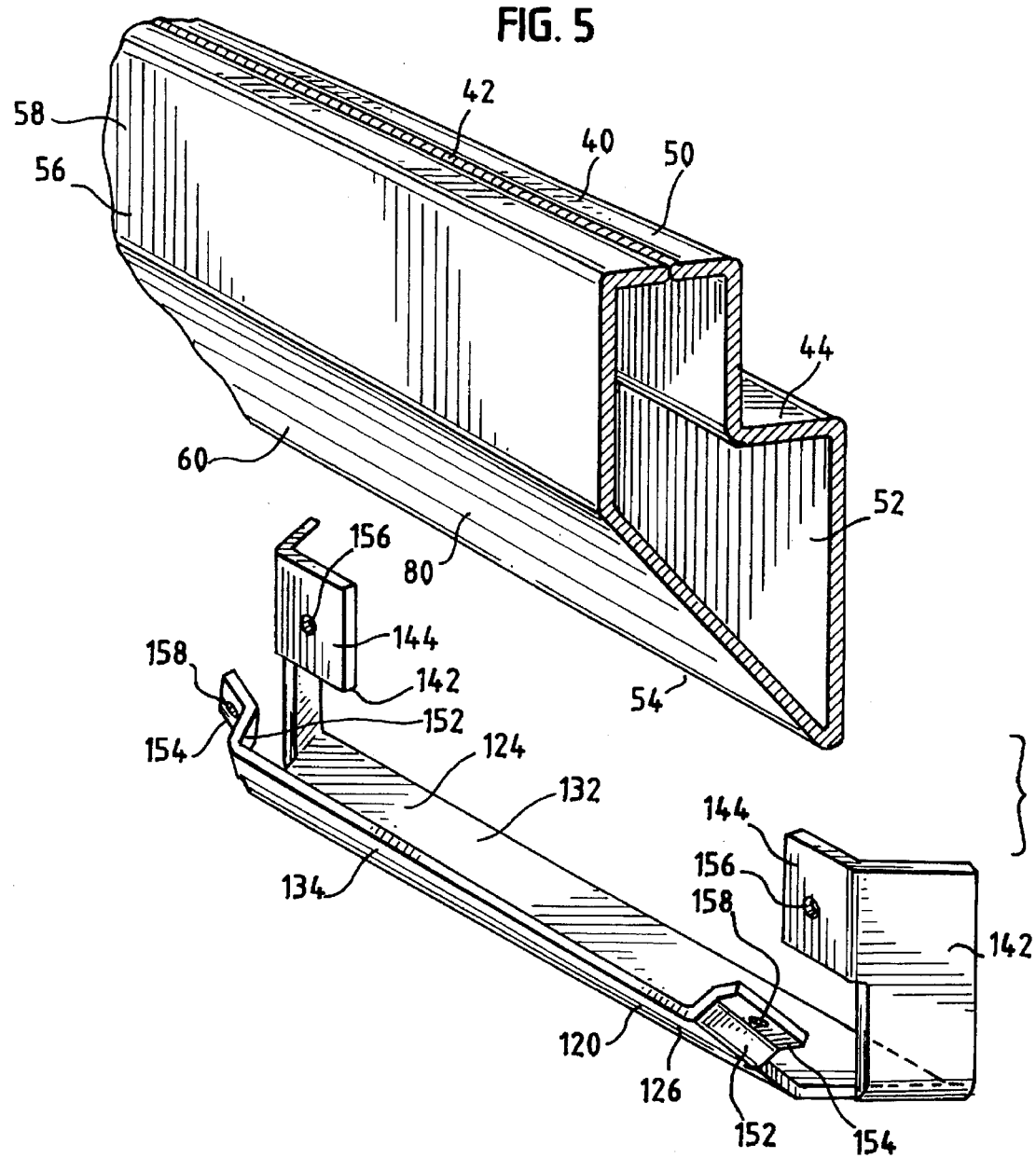
FIG. 5 is a fragmentary, exploded view showing the beam and the vane, as seen from yet another vantage.

As shown in FIG. 1, two storage racks 10 are supported on and by a support surface S, which is a warehouse floor. The storage racks are tied to each other or to an adjacent wall (not shown) by braces 12 (one shown) in a known manner.

Each storage rack 10 is similar to storage racks disclosed in U.S. Pat. No. 5,368,174 and U.S. Pat. No. 5,386,917 in that each storage rack 10 comprises upright frames 20 and support beams 40, which extend horizontally. The support beams 40 define multiple bays, each comprising multiple tiers and each tier being adapted to support a pallet load L, which comprises a load supported by a pallet. The disclosures of U.S. Pat. No. 5,368,174 and U.S. Pat. No. 5,386,917 are incorporated herein by reference.

Except as illustrated and described herein, each support beam 40 is similar to one of the support beams disclosed in U.S. Pat. No. 5,368,174 and U.S. Pat. No. 5,386,917 in that each support beam 40 is formed from sheet steel and is welded along a seam 42 so as to have a tubular profile. As shown, the tubular profile defines an upper, inner ledge 44, which is adapted to support one edge portion of a wooden or steel deck (not shown) or spaced wooden or steel braces 46 (see FIG. 1) in a known manner.

Moreover, the tubular profile defines an upper, load-supporting edge 50, which is adapted to support one edge portion of a pallet load L, an inner wall 52 extending downwardly from the ledge 44, toward a lower edge 54 of such support beam 40, and an outer wall 56. The outer wall 56 has an upper portion 58 extending downwardly from the upper edge 50 and a lower portion 60 extending downwardly and inwardly from the upper portion 58, at an obtuse angle relative to the upper portion 58, toward the lower edge 54 and merging with the inner wall 52 at the lower edge 54.

Furthermore, the lower portion 60 defines a flat, outer surface 80, which faces outwardly and downwardly, and which is inclined at an angle in a range from about 10° to about 80° relative to a vertical plane. The inclined surface 80 is similar to one of the inclined surfaces disclosed in U.S. Pat. No. 5,368,174 and U.S. Pat. No. 5,386,917.

As shown in FIGS. 1 and 2, a fire extinguishing device 100 of a known type is mounted between two support beams 40, namely one storage beam 40 from each of the storage racks 10. So as to prevent the fire extinguishing device from being struck by a load L, which could damage or accidentally discharge the fire extinguishing device 100, when the load L was being placed onto one of the storage racks 10, the fire extinguishing device 100 is mounted generally at the elevation of the inclined surfaces 80 of the support beams 40. The fire extinguishing device employs a deflector 102 of a known type. The fire extinguishing device 100 is mounted to the adjacent wall in a known manner, via a hanger 110 and a pipe 112, which supplies water or another fire extinguishing fluid to the fire extinguishing device 100.

Figure 6:
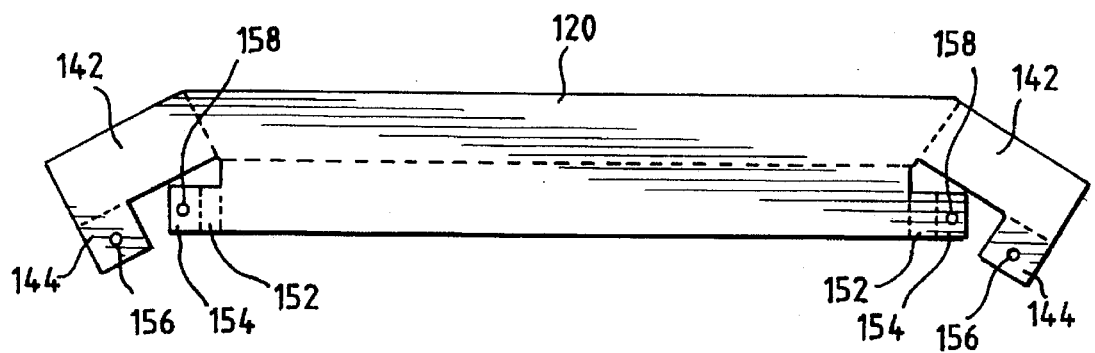
FIG. 6 is a plan view of the vane, as seen after the vane has been stamped from sheet metal and before the vane is folded for mounting to the beam.

In accordance with this invention, a vane 120 is mounted rigidly to each support beam 40 so as to extend substantially but not entirely between the opposite ends of such support beam 40, so as to extend horizontally, below such support beam 40, and so as to be parallel to such support beam 40. Each vane 120 is stamped from sheet steel, in a pattern exemplified by a pattern shown in FIG. 6, folded along folding lines exemplified by folding lines shown in FIG. 6, and mounted to a support beam 40 via self-tapping screws 122. Blind rivets, welds, other suitable means (not shown) may be alternatively used to mount each vane 120 to a support beam 40.

As shown in FIG. 3 and other views, each vane 120 has a surface 124 facing the associated beam 40 and a surface 126 facing away from the associated beam 40. Moreover, each vane 120 is folded so as to have an inner portion 132 and an outer portion 134, the outer portion defining an obtuse angle relative to the inner portion 132, so as to have a flange 142 with a mounting tab 144 at each of the opposite ends of the inner portion 132, and so as to have a flange 152 with a mounting tab 154 at each of the opposite ends of the outer portion 134. The screws 122 are driven through holes 156 in the mounting tabs 144, into the inner wall 52 of the associated beam 40, and through holes 158 in the mounting tabs 154, into the lower portion 60 of the outer wall 56 of the associated beam 40.

At the inner portion 132 of each vane 120, the surface 124 facing toward the associated beam 40 defines an angle within a range from about 80° below a horizontal plane to about 90° above a horizontal plane and is shown as extending inwardly in a substantially horizontal direction, as preferred. As shown in broken lines in FIG. 3, each vane 120 would have a cup-shaped profile if the inner portion 132 of such vane 120 were to extend above a horizontal plane. Moreover, at the outer portion 134 of each vane 120, the surface 126 facing away from the associated beam 40 is inclined so as to be generally parallel to the inclined surface 80 of the associated beam 40.

When the fire extinguishing device 100 is discharging a fluid, if at least some of the discharged fluid impinges upon the inclined surface 80 of the associated beam 40, the inclined surface 80 deflects at least some of the impinging fluid against the surface 124 facing toward the associated beam 40 whereupon the same surface 124 redirects at least some of the deflected fluid.

Each vane 120 can be thus used to redirect at least some of the deflected fluid across a pallet load L, in a horizontal or other trajectory, whereby the redirected fluid can cover areas that may not be well covered if at least some of the deflected fluid is not redirected.

Moreover, if any of the discharged fluid impinges upon the vane surface 126 facing away from the associated beam 40 at the outer portion 134 of such a vane 120, the same surface 126 deflects at least some of the impinging fluid downwardly and inwardly.

Various modifications may be made in the preferred embodiment described above without departing from the scope and spirit of this invention.

I claim:

1. A storage rack system comprising:
   (a) a storage rack including a beam located in a fixed position, at a predetermined elevation above a support surface, the beam extending horizontally and including an outer wall defining a generally flat, inclined surface facing outwardly and downwardly, the inclined surface being inclined at an angle in a range from about 10° to about 80° relative to a vertical plane, the storage rack further including a vane mounted so as to extend horizontally, below the beam, and so as to be parallel to the beam, the vane having a surface facing toward the beam; and
   (b) a fire extinguishing device arranged to discharge a fluid, spaced horizontally from the inclined surface, and located in a fixed position relative to the storage rack, such that when the fire extinguishing device is discharging a fluid, if at least some of the discharged fluid impinges upon the inclined surface, the inclined surface reflects at least some of the impinging fluid against the surface facing toward the beam whereupon the surface facing toward the beam redirects at least some of the deflecting fluid,
      wherein the vane has an inner portion and an outer portion and wherein the surface facing toward the beam, at the inner portion of the vane, defines an angle within a range from about 80° below a horizontal plane to about 90° above a horizontal plane.

2. The storage rack of claim 1 wherein the vane has a surface facing away from the beam and wherein the surface facing away from the beam, at the outer portion of the vane, also is inclined so as to be generally parallel to the inclined surface of the beam.

3. The storage rack of claim 1 wherein the surface facing toward the beam, at the inner portion of the vane, extends inwardly in a substantially horizontal direction.

4. A storage rack system comprising:
   (a) a storage rack including a beam located in a fixed position, at a predetermined elevation above a support surface, the beam extending horizontally and including an outer wall defining a generally flat, inclined surface facing outwardly and downwardly, the inclined surface being inclined at an angle in a range from about 10° to about 80° relative to a vertical plane, the storage rack further including a vane mounted so as to extend horizontally, below the beam, and so as to be parallel to the beam, the vane having a surface facing toward the beam; and (b) a fire extinguishing device arranged to discharge a fluid, spaced horizontally from the inclined surface, and located in a fixed position relative to the storage rack, such that when the fire extinguishing device is discharging a fluid, if at least some of the discharged fluid impinges upon the inclined surface, the inclined surface deflects at least some of the impinging fluid against the surface facing toward the beam whereupon the surface facing toward the beam redirects at least some of the deflected fluid, wherein the vane has an inner portion and an outer portion, wherein the surface facing toward the beam, at the inner portion of the vane, extends inwardly in a substantially horizontal direction, and wherein the vane has a surface facing away from the beam and wherein the surface facing away from the beam, at the outer portion of the vane is inclined so as to be generally parallel to the inclined surface of the beam.

5. A storage rack system comprising:

(a) a storage rack including a beam located in a fixed position, at a predetermined elevation above a support surface, the beam extending horizontally and including an outer wall defining a generally flat, inclined surface facing outwardly and downwardly, the inclined surface being inclined at an angle in a range from about 10° to about 80° relative to a vertical plane, the storage rack further including a vane mounted so as to extend horizontally, below the beam, and so as to be parallel to the beam, the vane having a surface facing toward the beam; and (b) a fire extinguishing device arranged to discharge a fluid, spaced horizontally from the inclined surface, and located in a fixed position relative to the storage rack, such that when the fire extinguishing device is discharging a fluid, if at least some of the discharged fluid impinges upon the inclined surface, the inclined surface deflects at least some of the impinging fluid against the surface facing toward the beam whereupon the surface facing toward the beam redirects at least some of the deflected fluid, wherein the vane is mounted to the beam.

6. The storage rack of claim 6 wherein the vane has an outer portion mounted to the inclined surface of the beam and an inner portion mounted to an inner surface of the beam.

7. The storage rack of claim 6 wherein the outer portion of the vane is inclined so as to be generally parallel to the inclined surface of the beam.

8. The storage rack of claim 7 wherein the inner portion of the vane defines an angle within a range from about 80° below a horizontal plane to about 90° above a horizontal plane.

9. The storage rack of claim 8 wherein the inner portion of the vane extends inwardly in a substantially horizontal direction.

10. A storage rack system comprising:

(a) a storage rack including a beam located in a fixed position, at a predetermined elevation above a support surface, the beam extending horizontally and including an outer wall, the storage rack further including a vane having a surface facing toward the beam; and (b) a fire extinguishing device arranged to discharge a fluid and located in a fixed position relative to the storage rack, such that when the fire extinguishing device is discharging a fluid, if at least some of the discharged fluid impinges upon the outer wall, the outer wall deflects at least some of the impinging fluid against the surface facing toward the beam whereupon the surface facing toward the beam redirects at least some of the deflected fluid, wherein the vane is mounted to the beam so as to extend horizontally, below the beam, and so as to be parallel to the beam.

11. A storage rack system comprising:

(a) a storage rack including a rigid member located in a fixed position and a vane having a surface facing toward the rigid member; and (b) a fire extinguishing device arranged to discharge a fluid and located in a fixed position relative to the storage rack, such hat when the fire extinguishing device is discharging a fluid the surface facing toward the rigid member redirects at least some of the discharged fluid, wherein the rigid member is a beam extending horizontally and wherein the vane is mounted so as to extend horizontally, below the beam, and so as to be parallel to the beam, wherein the vane is mounted to the beam.

12. A storage rack comprising a beam located in a fixed position, at a predetermined elevation above a support surface, the beam extending horizontally and including an outer wall defining a generally flat, inclined surface facing outwardly and downwardly, the inclined surface being inclined at an angle in a range from about 10° to about 80° relative to a vertical plane, the storage rack further including a vane mounted so as to extend horizontally below the beam, and so as to be parallel to the beam, the vane having a surface facing toward the beam, wherein the vane has an inner portion and an outer portion and wherein the surface facing toward the beam, at the inner portion of the vane, defines an angle within a range from about 80° below a horizontal plane to about 90° above a horizontal plane.

13. The storage rack of claim 12 wherein the vane has a surface facing away from the beam and wherein the surface facing away from the beam, at the outer portion of the vane, also is inclined so as to be generally parallel to the inclined surface of the beam.

14. The storage rack of claim 12 wherein the surface facing toward the beam, at the inner portion of the vane, extends inwardly in a substantially horizontal direction.

15. A storage rack comprising a beam located in a fixed position, at a predetermined elevation above a support surface, the beam extending horizontally and including an outer wall defining a generally flat, inclined surface facing outwardly and downwardly, the inclined surface being inclined at an angle in a range from about 10° to about 80° relative to a vertical plane, the storage rack further including a vane mounted so as to extend horizontally, below the beam, and so as to be parallel to the beam, the vane having a surface facing toward the beam.

wherein the surface facing toward the beam, at the inner portion of the vane extends inwardly in a substantially horizontal direction, and wherein the vane has a surface facing away from the beam and wherein the surface facing away from the beam, at the outer portion of the vane is inclined so as to be generally parallel to the inclined surface of the beam.

16. A storage rack comprising a beam located in a fixed position, at a predetermined elevation above a support surface, the beam extending horizontally and including an outer wall defining a generally flat, inclined surface facing outwardly and downwardly, the inclined surface being inclined at an angle in a range from about 10° to about 80° relative to a vertical plane, the storage rack further including a vane mounted so as to extend horizontally, below the beam, and so as to be parallel to the beam, the vane having a surface facing toward the beam, wherein the vane is mounted to the beam.

17. The storage rack of claim 16 wherein the vane has an outer portion mounted to the inclined surface of the beam and an inner portion mounted to an inner surface of the beam.

* * * * *